(12) United States Patent
Sahu et al.

(10) Patent No.: US 12,725,810 B2
(45) Date of Patent: Sep. 1, 2026

(54) FUEL CELL DRY END WITH O-RING COMPRESSION SEAL

(71) Applicant: GM GLOBAL TECHNOLOGY OPERATIONS LLC, Detroit, MI (US)

(72) Inventors: Abhishek Kumar Sahu, Bengaluru (IN); Ronald Miller, Bloomfield Hills, MI (US); Brian Miller, Royal Oak, MI (US); Bhaskara K. Ch, Andhra Pradesh (IN); Neeraj Mishra, Uttar Pradesh (IN)

(73) Assignee: GM Global Technology Operations LLC, Detroit, MI (US)

( * ) Notice: Subject to any disclaimer, the term of this patent is extended or adjusted under 35 U.S.C. 154(b) by 517 days.

(21) Appl. No.: 18/499,389

(22) Filed: Nov. 1, 2023

(65) Prior Publication Data

US 2025/0140877 A1 May 1, 2025

(51) Int. Cl.

| | |
|---|---|
| ***H01M 8/0273*** | (2016.01) |
| ***B60L 50/72*** | (2019.01) |
| ***H01M 8/0202*** | (2016.01) |
| ***H01M 8/248*** | (2016.01) |
| ***H02P 27/06*** | (2006.01) |

(52) U.S. Cl.

CPC ........... *H01M 8/0273* (2013.01); *B60L 50/72* (2019.02); *H01M 8/0202* (2013.01); *H01M 8/248* (2013.01); *H02P 27/06* (2013.01); *H01M 2250/20* (2013.01)

(58) Field of Classification Search

CPC .. H01M 8/0273; H01M 8/0202; H01M 8/248; H01M 2250/20; B60L 50/72; H02P 27/06

USPC ........................................................ 429/508

See application file for complete search history.

(56) References Cited

U.S. PATENT DOCUMENTS

| | | | | |
|---|---|---|---|---|
| 2004/0137299 A1 | 7/2004 | Mazza | | |
| 2005/0260479 A1 | 11/2005 | Raiser | | |
| 2011/0244355 A1* | 10/2011 | Skala | ................. | H01M 8/2475 429/468 |
| 2012/0034545 A1 | 2/2012 | Yamaura | | |
| 2021/0036344 A1 | 2/2021 | Kaneko et al. | | |
| 2021/0043961 A1 | 2/2021 | Itou et al. | | |

(Continued)

FOREIGN PATENT DOCUMENTS

DE 102021004963 A1 4/2023

*Primary Examiner* — James M Erwin

(74) *Attorney, Agent, or Firm* — Quinn IP Law

(57) ABSTRACT

A fuel cell system, e.g., of a motor vehicle, includes a fuel cell stack having fuel cells and non-repeating hardware components, the latter including wet and dry end units. The cells are positioned between the end units. The dry end unit includes an end plate and a compression plate assembly that uniformly compresses the cells against the end plate, and a terminal plate surrounded by a seal plate. An insulator frame disposed adjacent to the compression plate assembly is engaged with the insulator frame via a frictional interface provided by o-ring compression seals having a respective post connected to the terminal plate and the seal plate, and a pocket connected to the insulator frame. The post and pocket of at least one of the compression seals together define a fluid passage. One or more shim plates may be disposed between the end plate and insulator frame.

20 Claims, 6 Drawing Sheets

(56) References Cited

U.S. PATENT DOCUMENTS

2021/0249679 A1* 8/2021 Rock ................ H01M 8/04104
2023/0317976 A1* 10/2023 Domanski .......... H01M 8/0256

* cited by examiner 58
53
52
64
IF
56
50
60
55
42
TP
FCS
18

69
66
56
DD
68
50
CC
60
IF
52
56
44
SP
FCS
18
CC
58

FUEL CELL DRY END WITH O-RING COMPRESSION SEAL

INTRODUCTION

The present disclosure relates to electrochemical fuel cell systems operable for converting gaseous hydrogen or another suitable reactant into electricity. More specifically, aspects of the disclosure relate to hardware solutions for internal sealing and insulation of the fuel cell system.

Advanced hybrid-electric and full-electric vehicles may employ a fuel cell system to produce an electrical current. A hydrogen (H2) fuel cell is a particular electrochemical device composed of a negative electrode/anode that receives a supply of gaseous H2, a positive electrode/cathode that receives ambient air as an oxidizing agent, and an electrolyte material interposed between the anode and cathode. An induced electrochemical reaction oxidizes H2 molecules at the anode side of the fuel cell. H2 gas admitted into the fuel cell is catalytically split to generate free electrons and protons. The free protons pass through the electrolyte to the cathode side of the fuel cell, where they react with oxygen (O2) molecules from the ambient environment. Water vapor and heat form inert by-products of this chemical reaction. The free electrons from the anode are then directed to a connected load, e.g., one or more electric traction motors or other electrical components/accessories.

Fuel cell stacks used for automotive and other high-current applications often utilize a solid polymer electrolyte membrane (PEM). The PEM provides ion transport between the aforementioned anode and cathode. The catalytic layers of the anode and cathode and an electrolyte membrane collectively define a membrane electrode assembly (MEA), which in turn is disposed between gas diffusion layers (GDLs). The GDLs in turn are disposed between bipolar plates (BPPs) to form the fuel cell. Multiple fuel cells are assembled into a fuel cell stack to yield the requisite current and voltage for powering a given application. The BPPs collectively define circuitous flow channels for distributing H2 and O2 reactant gases through the fuel cell stack. Elastomeric seals or other types of seals, e.g., metal bead seals, are provided around the edges of the MEA, surfaces of the BPPs, and end plate units of the stack to ensure effective separation of the reactant and coolant flows while also preventing leakage and intermixing of the various gasses.

SUMMARY

Disclosed herein is a fuel cell system having a fuel cell stack. The fuel cell stack includes non-repeating hardware (NRHW) components, one of which is constructed as a dry end unit disposed opposite a wet end unit. The solutions set forth herein are intended to render the dry end unit more compact and robust relative to existing constructions.

The fuel cell system in accordance with a representative embodiment includes a fuel cell stack having a plurality of fuel cells, along with the above-noted wet and dry end units. The fuel cell stack is positioned between the wet end unit and the dry end unit. The dry end unit may include a compression plate assembly, an insulator frame, and a plurality of o-ring compression seals. The compression plate assembly, which is configured to uniformly compress the fuel cells, includes a terminal plate (also referred to as a current collector plate) and a seal plate. The seal plate is sometimes informally referred to as a SUS plate due to its typical 304 Stainless Steel Use (SUS) material construction. The terminal plate is surrounded by the seal plate. The insulator frame is disposed adjacent to the compression plate assembly. The compression plate assembly and the insulator frame are mutually engaged via a frictional interface provided by the o-ring compression seals. The o-ring-based frictional interface as contemplated herein is helpful in many ways, e.g., when handling the dry end unit as an assembled single unit during conveyance, fuel cell stack assembly, and drainage of reactants and by-products.

The o-ring compression seals may each include (i) an elongated post connected to or formed integrally with the seal plate, (ii) an elongated post connected to or formed integrally with the terminal plate, and (iii) a pocket defined by the insulator frame and configured to receive the elongated post of the terminal plate or the elongated post of the seal plate therein. In one or more embodiments, the elongated post connected to or formed integrally with the terminal plate or seal plate, and the pocket of at least one of the o-ring compression seals, defines a fluid passage.

At least one shim plate may be disposed adjacent to the insulator frame. The at least one shim plate in such an embodiment may include a plurality of shim plates of different thicknesses. The shim plates collectively provide a predetermined level of cell compression of the fuel cells within the fuel cell stack. The shim plates may define one or more shim plate openings.

A conductive busbar may be connected to the terminal plate and protrude from the fuel cell stack.

In one or more embodiments, a direct current-to-direct current (DC-DC) converter is connected to the fuel cell stack, a direct current-to-alternating current (DC-AC) inverter circuit is connected to the DC-DC converter, and an AC-powered device connected to the DC-AC inverter circuit.

A dry end unit is also disclosed herein for a fuel cell stack. The dry end unit may include an end plate, a compression plate assembly, an insulator frame, and a plurality of o-ring compression seals. The compression plate assembly, which is configured to uniformly compress a plurality of fuel cells of the fuel cell stack against the end plate, include a terminal plate surrounded by a seal plate. The insulator frame is disposed adjacent to the compression plate assembly. The o-ring compression seals are configured to provide a frictional interface between the compression plate assembly and the insulator frame, such that the compression plate assembly and the insulator frame are mutually engaged via the frictional interface.

Also disclosed herein is a motor vehicle having a fuel cell stack, a reactant supply tank in fluid communication with the fuel cell stack, a DC-DC converter connected to the fuel cell stack, a DC-AC inverter circuit connected to the DC-DC converter, and an AC traction motor connected to the DC-AC inverter circuit. Additionally, one or more road wheels are connected to and powered by the AC traction motor.

The fuel cell stack in one or more embodiments of the motor vehicle includes a dry end unit having an end plate and a compression plate assembly, the latter being configured to uniformly compress a plurality of fuel cells of the fuel cell stack against the end plate, with the compression plate assembly having a terminal plate surrounded by a seal plate. A conductive busbar is connected to the terminal plate and protrudes from the fuel cell stack. An insulator frame is disposed adjacent to the compression plate assembly. The compression plate assembly and the insulator frame are mutually engaged via a frictional interface provided by a plurality of o-ring compression seals.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
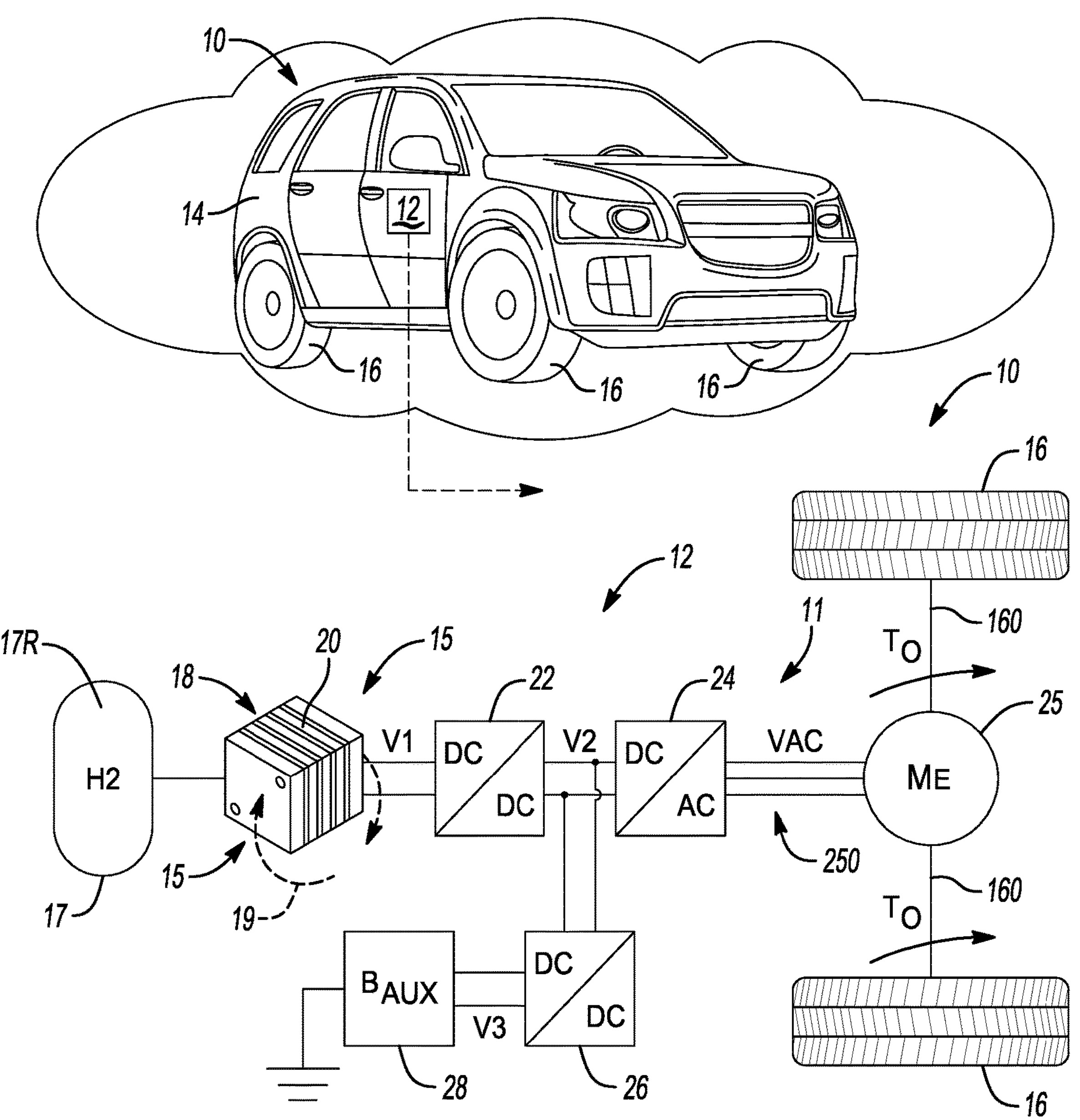
FIG. 1 illustrates a representative motor vehicle equipped with a powertrain system having a fuel cell system constructed using an o-ring sealing strategy as described herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numerals correspond to similar components throughout the several Figures, a motor vehicle 10 as shown in FIG. 1 is equipped with a fuel cell system 12 constructed in accordance with the present disclosure. The motor vehicle 10 includes a vehicle body 14 connected to a set of road wheels 16. As shown, the motor vehicle 10 may be configured as a passenger vehicle, e.g., a sport utility vehicle, sedan, truck, motorcycle, etc. However, the fuel cell system 12 could also be incorporated into a wide range of vehicles such as boats, aircraft, rail vehicles, farm equipment, etc., non-vehicular mobile platforms, or stationary systems such as power plants, hoists, and the like. Thus, the number of road wheels 16 attached to the vehicle body 14 may vary with the construction of the motor vehicle 10. The motor vehicle 10 of FIG. 1 is therefore used hereinafter as a non-limiting exemplary host system for the fuel cell system 12 without limiting the present teachings to such a use.

Figure 2:
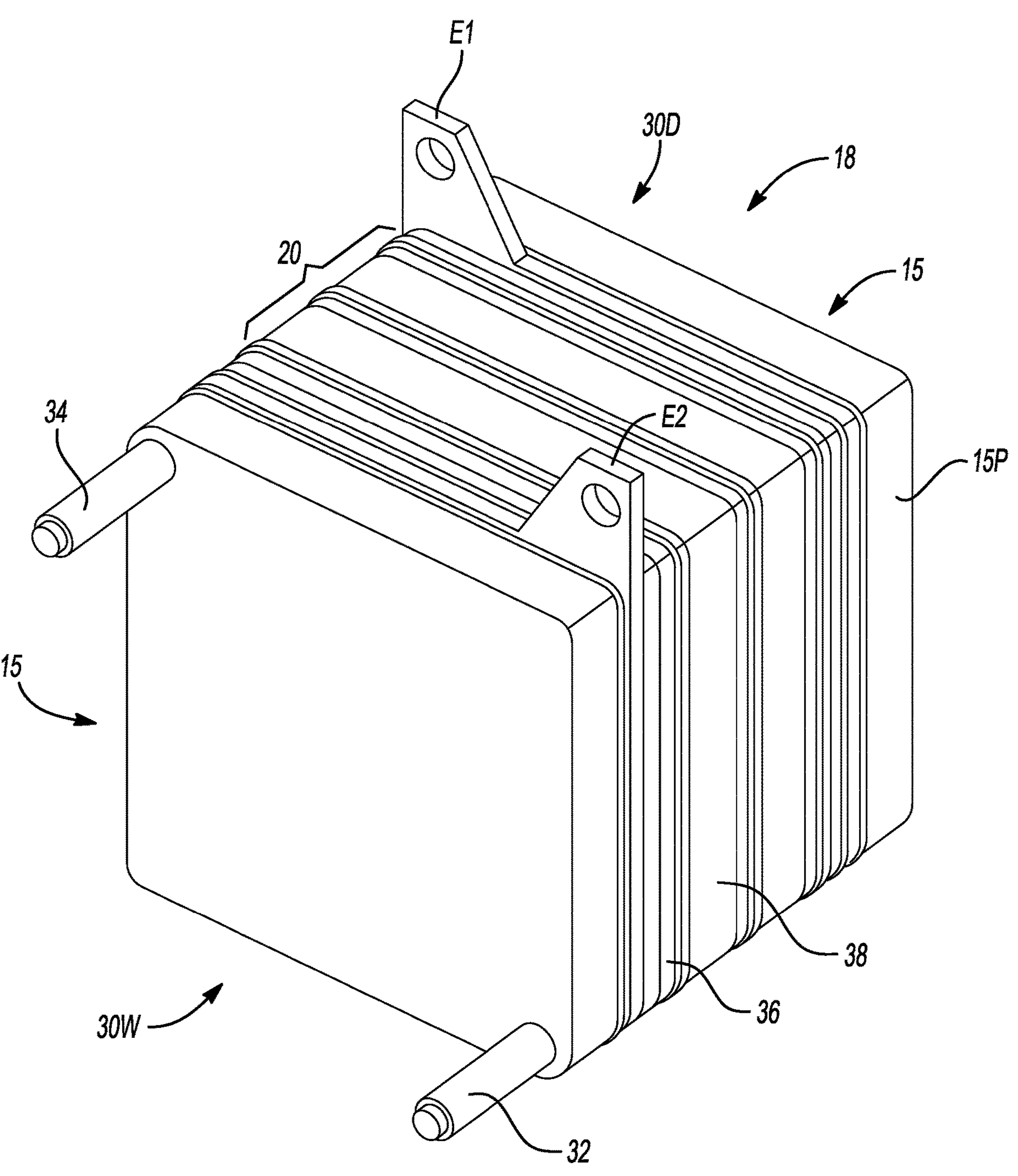
FIG. 2 illustrates a representative fuel cell stack having a non-repeating hardware (NRHW) component in the form of a dry end unit constructed in accordance with the present disclosure.

The fuel cell system 12 of FIG. 1 includes a fuel cell stack 18 having an application-suitable number of fuel cells 20 arranged therewithin. The fuel cells 20 are disposed between non-repeating hardware (NRHW) components 15, including a dry-end unit 30D as shown in FIG. 2 that is constructed as described below with reference to FIGS. 3A-8. Among other attendant benefits, use of the dry-end unit 30D of FIG. 2 increases sealing integrity and overall durability of the fuel cell stack 18 shown in FIGS. 1 and 2 while reducing assembly time and part count. The NRHW components 15 together integrate the individual fuel cells 20 into the fuel cell stack 18, support and aid in its construction, facilitate provision of various fluid passages to/from the fuel cell stack 18, and act as electrical and thermal insulation structure therewithin. The NRHW components 15 also facilitate compression of the fuel cell stack 18 and anode/cathode header drainage while acting as a place holder for additional fuel cells 20 as needed.

The fuel cell system 12 of FIG. 1 uses the fuel cell stack 18 to generate onboard electricity. As appreciated in the art, air and hydrogen (H2) or another suitable reactant gas 17R are fed from a reactant supply tank 17. The reactant supply tank 17 is in fluid communication with the fuel cell stack 18, e.g., via a series of valves, pressure regulators, and fittings (not shown). A suitable coolant (arrow 19) is similarly circulated through the fuel cell stack 18 to regulate temperature of the fuel cell stack 18. The fuel cell stack 18 for its part is constructed from an application-suitable number of fuel cells 20 to produce an electrical current, with water vapor and heat being inert byproducts of its operation.

An electrified powertrain system 11 using the fuel cell stack 18 of FIG. 1 may include a direct current-to-direct current (DC-DC) converter 22 to convert a DC input voltage (V1) from the fuel cell stack 18 into an application-suitable DC output voltage (V2). This action may be performed via a boost operation facilitated by high-speed switching of semiconductor power switches and transformers (not shown) residing within the DC-DC converter 22, e.g., insulated-gate bipolar transistors (IGBTs), metal oxide semiconductor field effect transistors (MOSFETs) or other FETs, or another switchable semiconductor-based components. The electrified powertrain system 11 may include one or more alternating current (AC) traction motors (ME) 25 as shown as part of a driven load, in this instance an electric traction motor coupled to one or more of the road wheels 16 via one or more axles 160.

A direct current-to-alternating current (DC-AC) inverter circuit 24 is disposed between the DC-DC converter 22 and the AC traction motor 25 in this particular configuration. Internal switching operation of the inverter circuit 24 ultimately converts the DC output voltage (V2) into an alternating current input voltage (VAC) suitable for energizing phase windings 250 of the AC traction motor(s) 25 or another AC-powered device, thereby causing machine rotation and transmission of motor output torque (To) to one or more of the road wheels 16. Other possible components of the electrified powertrain system 11 of FIG. 1 may include an auxiliary power module 26, i.e., another DC-DC converter operable for decreasing the DC output voltage (V2) to an auxiliary voltage (V3), e.g., nominally about 12-15V. A low-voltage auxiliary battery (BAUX) 28 is thus fed with the auxiliary voltage (V3) to power low-voltage functions aboard the motor vehicle 10 such as lights, display screens, door locks, windows, etc.

Referring briefly to FIG. 2, the fuel cell stack 18 of FIG. 1 is shown in simplified form. The NRHW components 15 include respective wet and dry end units 30W and 30D, between which is arranged a repeating number of the above-noted fuel cells 20 and positive and negative electrodes E1 and E2. Both of the wet and dry end units 30W and 30D include a respective end plate 15P forming a reaction surface during cell compression. Each fuel cell 20 includes a pair of the bipolar plates 38, with a membrane electrode assembly 36 disposed therebetween. One or more fluid inlets 32 disposed on the wet-end unit 30W are configured to admit a suitable reactant gas such as hydrogen (FIG. 1) into the fuel cell stack 18. Thus, "wet" is indicative of the particular inlet/outlet surface of the fuel cell stack 18. One or more fluid outlets 34, likewise disposed on the wet-end unit 30W in this embodiment, may allow for venting of water vapor and heat to the surrounding ambient environment. Other ports for supplying coolant and air are omitted from FIG. 2 for simplicity, but such ports may be used in alternative constructions of the fuel cell stack 18 within the scope of the disclosure.

Figure 3A:
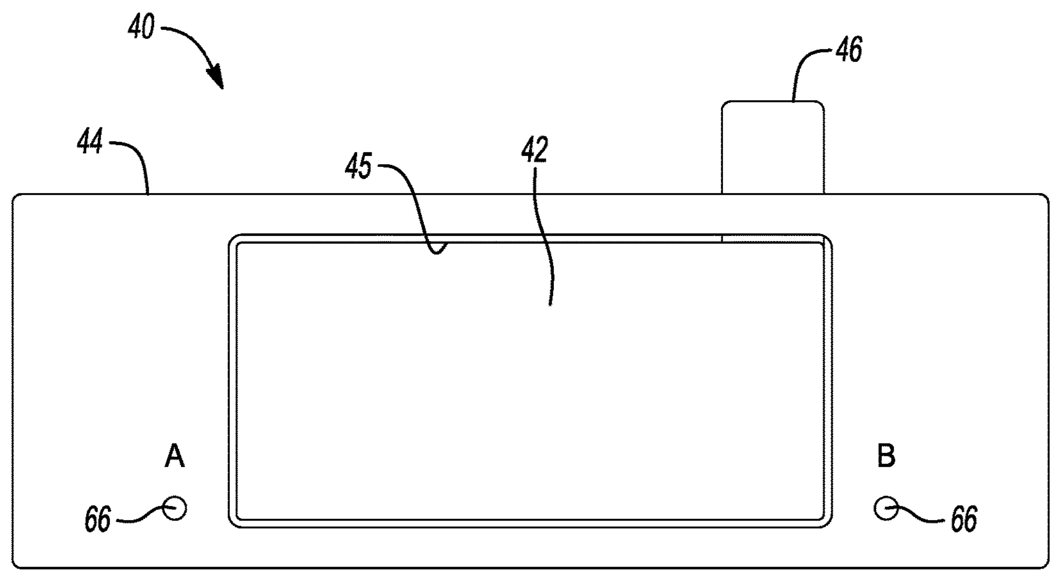
FIGS. 3A and 3B are plan view illustrations of opposing sides of a compression plate assembly of the dry end unit illustrated in FIG. 2.
Figure 3B:
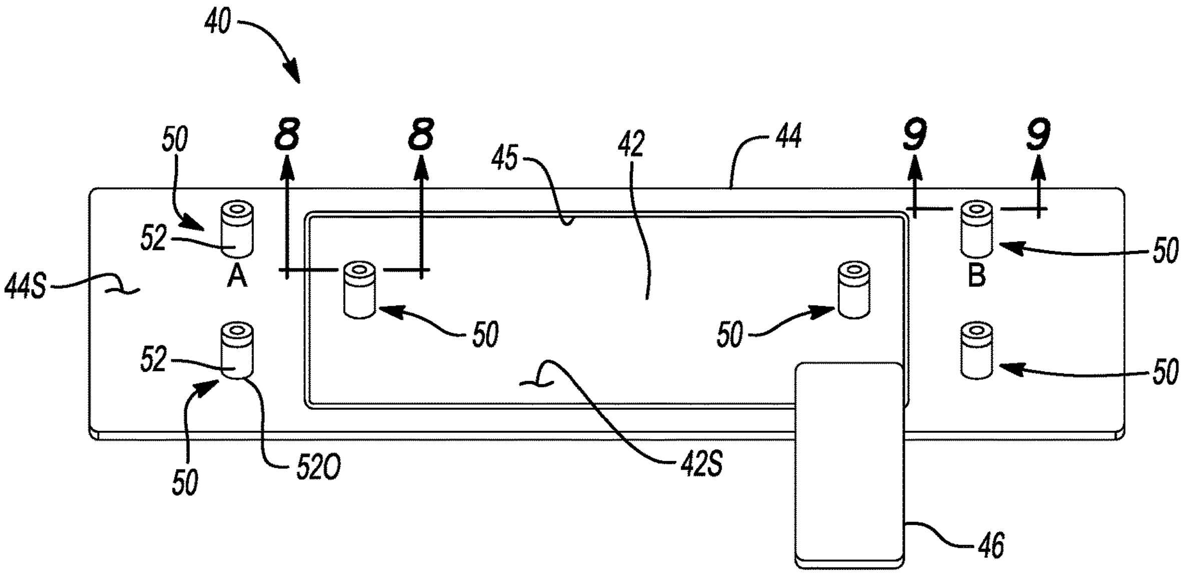

FIGS. 3A and 3B illustrate a representative compression plate assembly 40 for use with the dry-end unit 30D of FIG. 2, and for uniformly compressing the fuel cells 20 against the end plate 15P of the dry end unit 30D. The compression plate assembly 40, which as contemplated herein has a generally rectangular perimeter shape, is formed with a dual-plate construction. In such a construction, a terminal plate 42, e.g., a flat bar or plate of copper or another suitable electrical conductor (also referred to in the art as a current collector), is disposed within or surrounded by a seal compression plate ("seal plate" 44, for instance a stainless steel plate such as 304SUS as noted above. The seal plate 44 may define a through-opening or window 45, with the terminal plate 42 being disposed within the window 45 and possibly attached around its perimeter to the surrounding seal plate 44, for instance via welding or brazing. A conductive busbar 46 may be connected to the terminal plate 42 as shown, likewise via welding or brazing, with the conductive busbar 46 possibly forming or being connected to the electrode E1 or E2 of FIG. 2. In such an embodiment, the conductive busbar 46 acts as an electrode tab and protrudes a suitable distance from the fuel cell stack 18.

As part of the present construction, the terminal plate 42 and the seal plate 44 are connected to or formed integrally with a plurality of o-ring compression seals 50 as illustrated in FIG. 3B. The o-ring compression seals 50 are configured to provide a frictional interface between the compression plate assembly 40 and the insulator frame 60, such that the compression plate assembly 40 and the insulator frame 60 are mutually engaged via the frictional interface. This is helpful in many ways as noted above, for instance in handling the dry end unit 30D as an assembled single unit during conveyance, during assembly of the fuel cell stack 18, and during drainage of reactants and by-products. In a possible construction, the o-ring compression seals 50 include elongated posts 52 that are connected at one end 520 to a corresponding surface 42S of the terminal plate 42 or 44S of the seal plate 44 in different locations. As set forth below, one or more of the elongated posts 52 surrounds and at least partially defines a fluid passage 66 (see zones A and B of FIG. 3A). The o-ring compression seals 50 collectively facilitate secure integration of the compression plate assembly 40 into the fuel cell stack 18 of FIGS. 1 and 2. In particular, the o-ring compression seals 50 facilitate integration of the compression plate assembly 40 with an insulator frame 60 of the fuel cell stack 20, as will now be described in detail with reference to FIG. 4.

Figure 4:
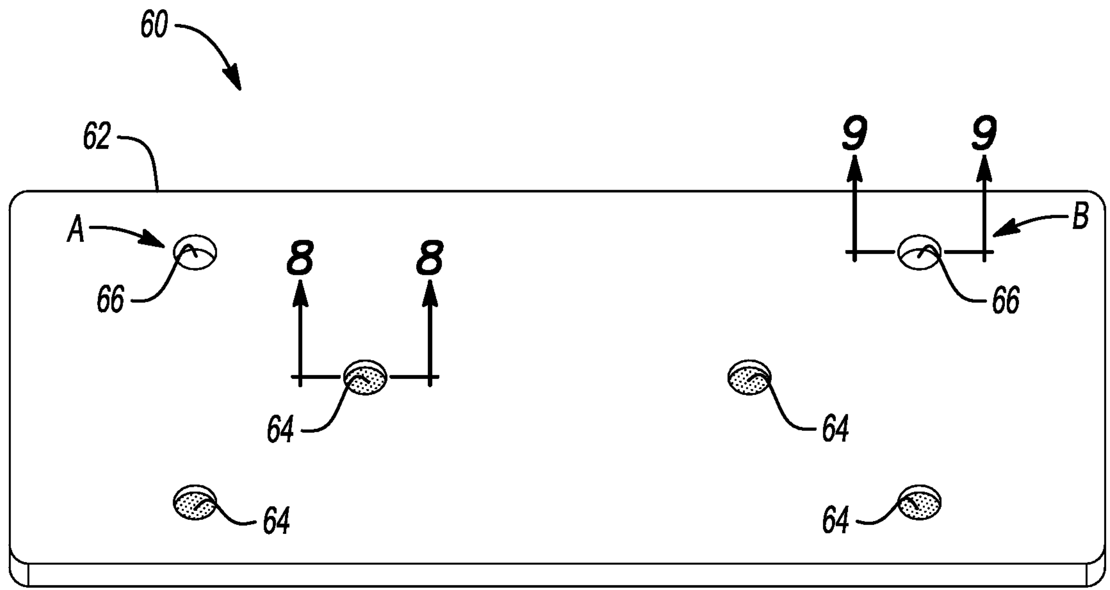
FIG. 4 is a plan view illustration of a representative insulator frame for the dry end unit shown in FIG. 2.

The insulator frame 60 of FIG. 4 is configured as a generally rectangular plate of a suitable thermal and electrical insulation material, e.g., a polymer dielectric. As contemplated herein, the insulator frame 60 includes an interfacing surface 62 that, in the assembled fuel cell stack 18 of FIGS. 1 and 2, directly abuts the compression plate assembly 40 illustrated in FIGS. 3A and 3B. A plurality of pockets 64 are defined by or formed integrally with the interfacing surface 62 of the insulator frame 60, with each of the pockets 64 acting as a mating engagement point for locating and securing the above-noted elongated posts 52 protruding from the terminal plate 42 and the seal plate 44 (see FIG. 3B). In some instances, the pockets 64 may circumscribe the fluid passages 66 passing through the insulator frame 60 and the seal plate 44, with two such fluid passages 66 illustrated in FIGS. 3A, 3B, and 4 and indicated as A and B. Thus, the pockets 64 could be closed at one end, such that fluid cannot flow through the insulator frame 60 and the seal plate 44 at the connection point corresponding with the pocket 64, or the pockets 64 may be open at both ends to form a corresponding one of the fluid passages 66 as a through-passage.

The particular number and location of the elongated posts 52 and pockets 64, themselves possibly cylindrical in shape/circular in cross-section in one or more embodiments, may vary with the particular construction of the fuel cell stack 18 of FIGS. 1 and 2. Therefore FIGS. 3A, 3B, and 4 are exemplary of the present teachings and non-limiting thereof. Embodiments of the compression plate assembly 40 may be characterized by an absence of bolts, screws, or other threaded fasteners in one or more embodiments, the functions of which are instead performed by the o-ring compression seals 50.

Figure 5:
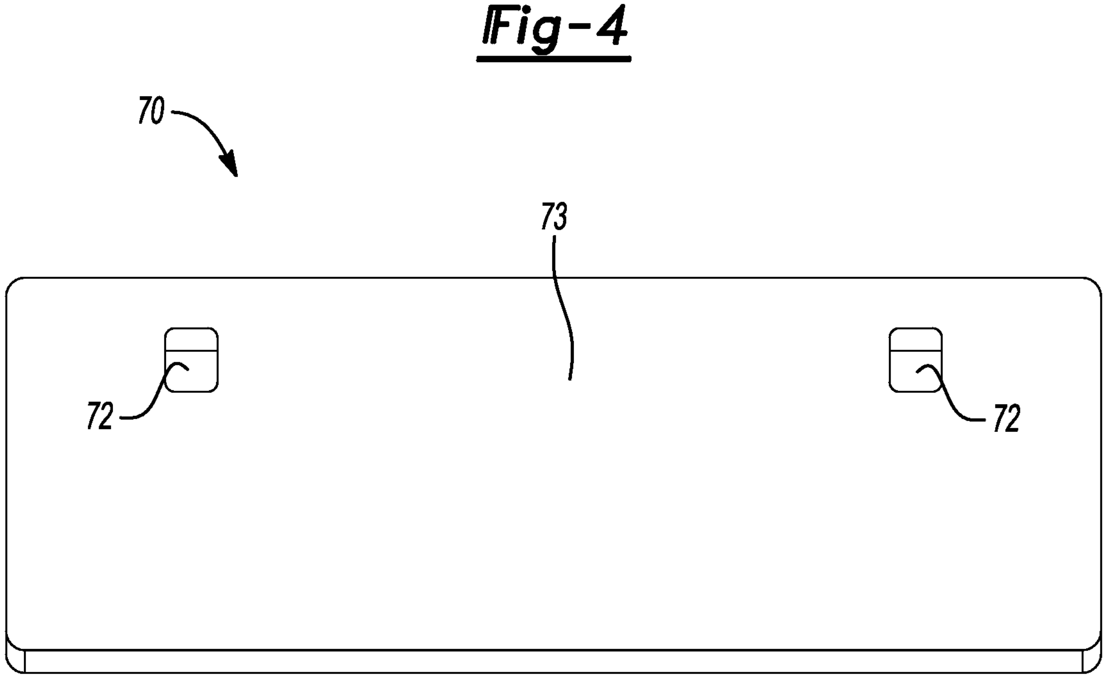
FIG. 5 is a plan view illustration of a shim plate usable with the dry end unit of FIG. 2.

Referring to FIG. 5, the compression plate assembly 40 of FIGS. 3A and 3B and the insulator frame 60 of FIG. 4 may be used in conjunction with one or more shim plates 70 for mechanical precision. At least one shim plate 70 as contemplated herein is disposed adjacent to the insulator frame 60 to serve as one or more gauge plates, and to help control compression loads within the fuel cell stack 18 of FIGS. 1 and 2, as well as to reduce weight, maintain strength, and obtain a desired stack compression. The shim plates 70 may define one or more shim plate openings 72, e.g., inline with a header (not shown) of the fuel cell stack 18. Such shim plate openings 72 could be used in one or more embodiments to reduce weight of the shim plate 70 without altering load paths, and could have a variety of shapes and locations on a surface 73 of the shim plate 70, including but not limited to circular, rectangular, polygonal, etc. As noted below with reference to FIG. 8, one or more of the shim plates 70 could be selected from an inventory of shim plates 70 during manufacturing and used within the fuel cell stack 18 as needed, with the shim plates 70 possibly having an assortment of different thicknesses to optimize construction of the fuel cell stack 18 illustrated in the representative embodiment of FIGS. 1 and 2.

Figures 6, 7:
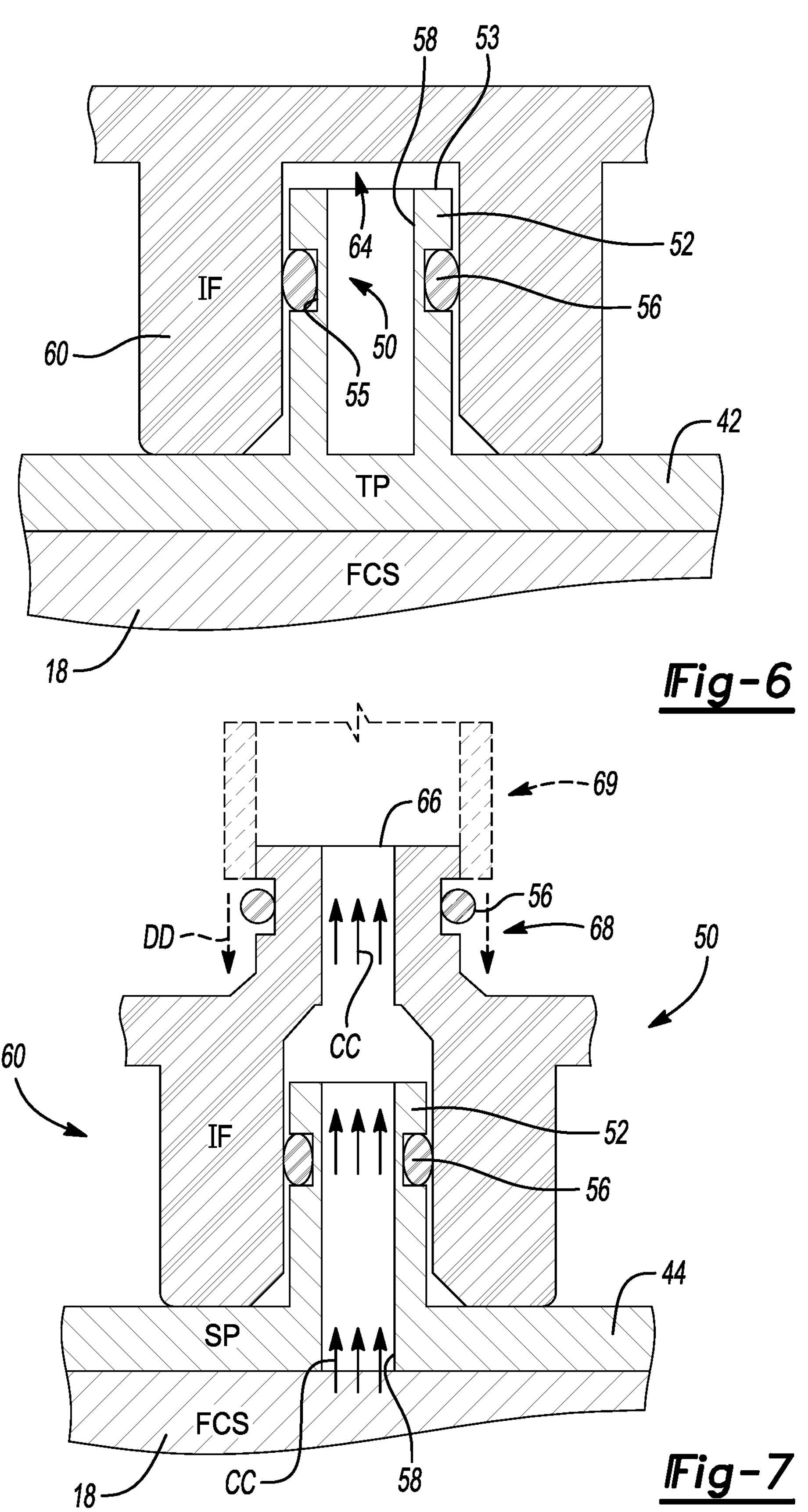
FIG. 6 is a cross-sectional illustration of an o-ring compression seal for use with the dry end unit of FIG. 2.
FIG. 7 is a cross-sectional illustration of the o-ring compression seal shown in FIG. 6 used in conjunction with an anode/cathode header drain.

FIGS. 6 and 7 depict cross-sectional views of the o-ring compression seals 50 of FIGS. 3A-4 taken along cut lines 8-8 and 9-9 of FIG. 3B, respectively. As shown in FIG. 6, each pocket 64 of the insulator frame (IF) 60 acts as an engagement point for receiving therein and securing the above-noted elongated posts 52, with the elongated posts 52 protruding from the terminal plate (TP) 42 adjacent the fuel cell stack (FCS) 18 as noted above. The elongated posts 52 in turn may define a circumferential groove 55, e.g., near a distal end 53 of the elongated posts 52 opposite the terminal plate 42. An elastomeric o-ring 56 is disposed within the circumferential groove 55 that is constructed of an application-suitable material. Construction of the o-ring 56 is dependent upon operating conditions such as temperature range and the particular fluids encountered within the fuel cell stack 18, with non-limiting exemplary materials including application-suitable fluoroelastomers, silicone, polytetrafluoroethylene (PTFE), ethylene propylene diene monomer (EPDM), etc. Likewise, the various elastomeric o-rings 56 may be constructed of different materials at different locations of the fuel cell stack 18.

As noted above, some of the elongated posts 52 may be a cylindrical shell, i.e., hollow, thus defining therein an axially-extending inner diameter wall 58. Such a construction would reduce part count by providing a common construction suitable for use with the fluid passages 66 (zones A and B) as well as with non-fluid conducting o-ring compression seals 50, e.g., on the terminal plate 42 as depicted in FIG. 6.

That is, as shown in FIG. 7 the elongated posts 52 could be attached to/formed integrally with the seal plate (SP) 44 and used to direct fluid (arrows CC) through the insulator frame 60. To facilitate connection of the insulator frame 60 to external hardware, e.g., an anode/cathode header drain port 69, a flange post 68 may extend from the insulator frame 60. The flange post 68 for its part may be circumscribed and attached to another o-ring 56 for optimal fluidic sealing. That is, the drain port 69 may be pressed onto the flange post 68 as indicated by arrow DD such that the elastomeric o-rings 56 form a fluid seal between the drain port 69 and the flange post 68.

Figure 8:
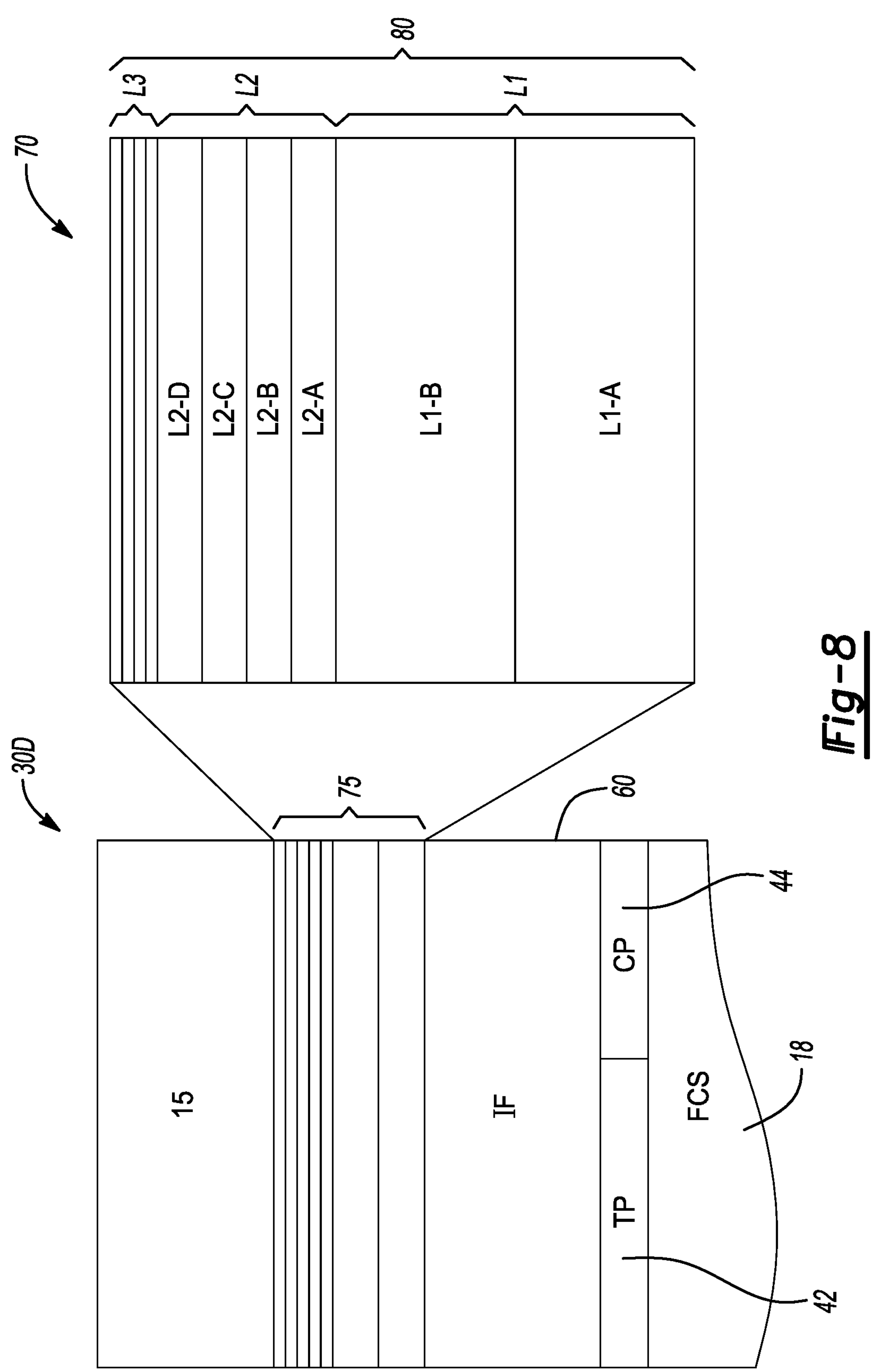
FIG. 8 is an illustration of a representative stack-up of the dry end unit of FIG. 2 in a possible multi-shim plate implementation.

FIG. 8 is a simplified illustration of a representative shim stack-up 80 of the above-described shim plates 70, one of which is shown in FIG. 5. In a possible construction, the shim plates 70 are available in multiple thicknesses, e.g., about 0.25 mm to about 5 mm. Multiple thicknesses provide a wider range of combinations for precise cell compression adjustment. For example, a slack zone 75 may be present within the fuel cell stack 18 between the NRHW component 15 of the dry end unit 30D and the insulator frame 60, with the slack zone 75 being a region that is not otherwise occupied by components of the fuel cell stack 18. Such a slack zone 75 in one or more implementations could be filled with a first shim layer L1 of relatively thick shim plates 70 within this range, with two such shim plates 70 making up two shim layers L1-A and L1-B, each of about 4-5 mm in a possible implementation. A smaller second shim layer L2 could be constructed with multiple thinner versions of the shim plates 70, e.g., as shim layers L2-A, L2-B, L2-C, and L2-D in the representative four-layer embodiment of the second shim layer L2. Each of the shim layers L2-A, L2-B, L2-C, and L2-D may be about 1-2 mm in a possible implementation. If space remains within the slack zone 75, one or more of the thinnest available shim plates 70, e.g., 0.25 mm-0.5 mm, could be inserted as layer(s) L3 into the remaining space to provide a predetermined level of cell compression.

The fuel cell system 12 described above thus incorporates the dry end unit 30D of FIG. 2 as an NRHW component 15 as part of its construction. As part of the dry end unit 30D, a pair of metal plates, i.e., the terminal plate 42 and the seal plate 44 of FIGS. 3A and 3B, are used to uniformly compress the fuel cells 20 of FIG. 2 and facilitate collection of electricity generated by the fuel cell stack 18. The various distributed o-ring compression seals 50 of FIGS. 3A-4 help seal and integrate the interface between the compression plate assembly 40 and the insulator frame 60 (FIG. 4), as represented in FIGS. 6 and 7. The insulator frame 60 provides application-specific levels of thermal and electrical insulation. The hardware solutions described herein also increase the overall stiffness of the fuel cell stack 18 and allow for the use of the shim plates 70 of FIGS. 5 and 8 as needed for precise compression of the fuel cell stack 18 of FIGS. 1 and 2. These and other attendant benefits of the disclosed dry end unit 30D will be readily appreciated by those skilled in the art in view of the foregoing disclosure.

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

What is claimed is:

1. A fuel cell system comprising:

a fuel cell stack having a plurality of fuel cells; and non-repeating hardware (NRHW) components, including a wet end unit and a dry end unit, wherein the fuel cells are positioned between the wet end unit and the dry end unit, the dry end unit comprising:

an end plate;

a compression plate assembly configured to uniformly compress the fuel cells against the end plate, and having a terminal plate surrounded by a seal plate;

an insulator frame disposed adjacent to the compression plate assembly; and a plurality of o-ring compression seals configured to provide a frictional interface between the compression plate assembly and the insulator frame, such that the compression plate assembly and the insulator frame are mutually engaged via the frictional interface.

2. The fuel cell system of claim 1, wherein the o-ring compression seals each include (i) an elongated post connected to or formed integrally with the seal plate, (ii) an elongated post connected to or formed integrally with the terminal plate, and (iii) a pocket defined by the insulator frame and configured to receive the elongated post of the terminal plate or the elongated post of the seal plate therein.

3. The fuel cell system of claim 2, wherein the elongated post connected to or formed integrally with the terminal plate or the elongated post connected to or formed integrally with the seal plate, and the pocket of at least one of the o-ring compression seals, defines a fluid passage.

4. The fuel cell system of claim 1, further comprising:

at least one shim plate disposed adjacent to the insulator frame.

5. The fuel cell system of claim 4, wherein the at least one shim plate includes a plurality of shim plates of different thicknesses, the shim plates collectively providing a predetermined level of cell compression of the fuel cells within the fuel cell stack.

6. The fuel cell system of claim 1, further comprising:
a conductive busbar connected to the terminal plate and protruding from the fuel cell stack.

7. The fuel cell system of claim 1, further comprising:
a direct current-to-direct current (DC-DC) converter connected to the fuel cell stack;
a direct current-to-alternating current (DC-AC) inverter circuit connected to the DC-DC converter; and
an AC-powered device connected to the DC-AC inverter circuit.

8. A dry end unit for a fuel cell stack, comprising:
an end plate;
a compression plate assembly configured to uniformly compress a plurality of fuel cells of the fuel cell stack against the end plate, the compression plate assembly having a terminal plate surrounded by a seal plate;
an insulator frame disposed adjacent to the compression plate assembly; and
a plurality of o-ring compression seals configured to provide a frictional interface between the compression plate assembly and the insulator frame, such that the compression plate assembly and the insulator frame are mutually engaged via the frictional interface.

9. The dry end unit of claim 8, wherein each of the o-ring compression seals includes (i) an elongated post connected to or formed integrally with the seal plate, ii) an elongated post connected to or formed integrally with the terminal plate,
and (ii) a pocket defined by the insulator frame, and configured to receive the elongated post of the terminal plate or the elongated post of the seal plate therein.

10. The dry end unit of claim 9, wherein the elongated post connected to or formed integrally with the terminal plate or the elongated post connected to or formed integrally with the seal plate, and the pocket of at least one of the o-ring compression seals, defines a fluid passage.

11. The dry end unit of claim 9, wherein the elongated post connected to or formed integrally with the terminal plate or the elongated post connected to or formed integrally with the seal plate is cylindrical.

12. The dry end unit of claim 8, further comprising:
at least one shim plate disposed between the end plate and the insulator frame.

13. The dry end unit of claim 12, wherein the at least one shim plate includes a plurality of shim plates of different thicknesses, the shim plates collectively providing a predetermined level of cell compression of the fuel cells within the fuel cell stack.

14. The dry end unit of claim 12, wherein the at least one shim plate defines a shim plate opening therethrough.

15. The dry end unit of claim 8, further comprising:
a conductive busbar connected to the terminal plate and protruding from the fuel cell stack.

16. A motor vehicle comprising:
a fuel cell stack;
a reactant supply tank in fluid communication with the fuel cell stack;
a direct current-to-direct current (DC-DC) converter connected to the fuel cell stack;
a direct current-to-alternating current (DC-AC) inverter circuit connected to the DC-DC converter;
an AC traction motor connected to the DC-AC inverter circuit; and
one or more road wheels connected to and powered by the AC traction motor, wherein the fuel cell stack comprises:
a dry end unit having an end plate;
a compression plate assembly configured to uniformly compress a plurality of fuel cells of the fuel cell stack against the end plate, the compression plate assembly having a terminal plate surrounded by a seal plate;
a conductive busbar connected to the terminal plate and protruding from the fuel cell stack;
an insulator frame disposed adjacent to the compression plate assembly; and
a plurality of o-ring compression seals, wherein the compression plate assembly and the insulator frame are mutually engaged via a frictional interface provided by the o-ring compression seals.

17. The motor vehicle of claim 16, wherein each of the o-ring compression seals includes (i) an elongated post connected to or formed integrally with the seal plate, ii) an elongated post connected to or formed integrally with the terminal plate, and (iii) a pocket defined by the insulator frame and configured to receive the elongated post of the terminal plate or the elongated post of the seal plate therein, and wherein the elongated post and the pocket of at least one of the o-ring compression seals defines a fluid passage.

18. The motor vehicle of claim 16, further comprising:
at least one shim plate disposed between the end plate and the insulator frame.

19. The motor vehicle of claim 18, wherein the at least one shim plate includes a plurality of shim plates of different thicknesses, the shim plates collectively providing a predetermined level of cell compression of the fuel cells within the fuel cell stack.

20. The motor vehicle of claim 18, wherein the at least one shim plate defines a shim plate opening therethrough.

* * * * *